(No Model.)
A. LEONARD.
POTATO DIGGING ATTACHMENT FOR PLOWS.
No. 445,004. Patented Jan. 20, 1891.
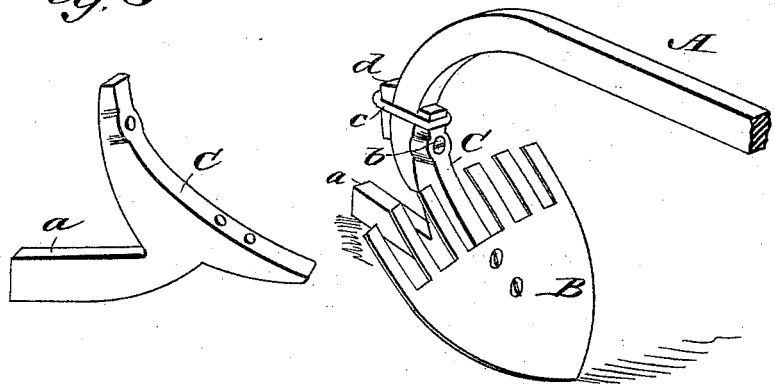
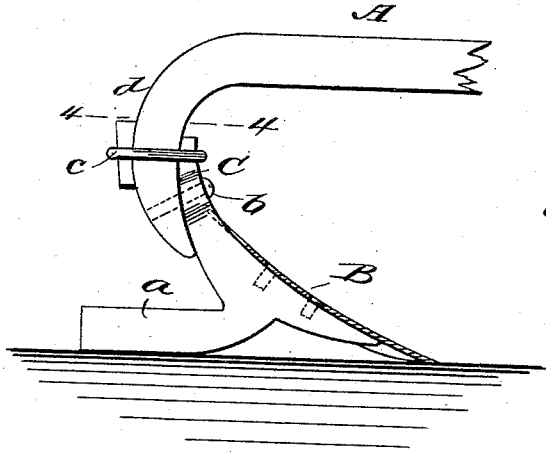
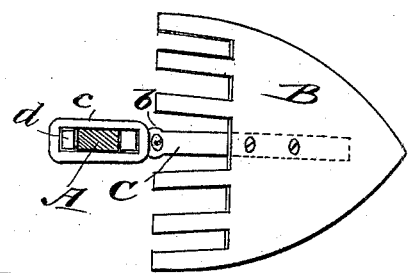
WITNESSES:
INVENTOR:
A. Leonard
BY
Munn & Co
ATTORNEYS

UNITED STATES PATENT OFFICE.

AUGUSTUS LEONARD, OF NEWELL'S RUN, OHIO.

POTATO-DIGGING ATTACHMENT FOR PLOWS.

SPECIFICATION forming part of Letters Patent No. 445,004, dated January 20, 1891.

Application filed February 25, 1890. Serial No. 341,703. (No model.)

*To all whom it may concern:*

Be it known that I, AUGUSTUS LEONARD, of Newell's Run, in the county of Washington and State of Ohio, have invented a new and Improved Potato-Digging Attachment for a Plow, of which the following is a full, clear, and exact description.

The operation of removing potatoes from the soil with a shovel or hoe is slow and laborious. Hence many devices have been constructed to facilitate the work by employment of draft-animals. The larger number of potato-digging machines are cumbrous and costly, their price debarring their use by farmers who raise small crops of potatoes and whose means do not warrant the expenditure of a considerable amount for the purchase of a large potato-digger.

The object of my invention is to provide a simple cheap appliance which may be quickly secured to the curved beams of an ordinary shovel-plow and when so attached afford means for the rapid and thorough excavation of potatoes from the soil, a triple-beam cultivator or shovel plow being preferred to utilize my improvement upon.

To this end my invention consists in certain features of construction and combination of parts, as is hereinafter described, and indicated in the claims.

Reference is to be had to the accompanying drawings, forming a part of this specification, in which similar letters of reference indicate corresponding parts in all the figures.

Figure 1 represents a portion of one beam of a triple or single shovel plow with the improved attachment thereon. Fig. 2 is a side elevation of the beam portion with the attachment secured thereto, partly in section. Fig. 3 is a detached view of the shovel-standard and a runner thereon; and Fig. 4 is a plan view of the shovel and plow-beam, the latter being in section taken on the line 4 4 in Fig. 2.

As usually constructed, shovel-plows are provided with metal beams which are curved downwardly at their rear ends, provision being made for bolting the shovel-blades to the same.

A represents a portion of a cultivator-plow beam, which may be either a single, double, or triple plow of ordinary approved construction, and if three beams and ordinary shovels are provided for the cultivator whereon the potato-digging device is to be applied it should be specified that the novel attachment is placed on the center beam, and if preferred the shovels or the other beams may be removed.

The digging-shovel B is bolted or otherwise secured upon a short standard C, which has its front side curved downwardly and forwardly, so as to present the correspondingly-bent blade of the shovel at a proper inclination to the ground operated upon.

The blade B is of spade form in contour, having its upper edge and a portion of the body furcated. The latter-named provision by its disintegrating action upon the soil excavated at the point of the blade exposes the potatoes contained in the same and leaves them on the surface of the ground.

The standard C is furnished with an integral runner *a*, which projects rearward at a proper point and forms a support for the digging shovel-blade B, gaging its depth of cut, thus affording a smooth-running implement easy to control.

The standard of the digging blade or shovel B is connected to its respective beam A by a screw-bolt *b* and a loop-clamp *c*, the latter being secured by a wedge *d*, driven in at the rear side of the beam A, and which, in conjunction with the screw-bolt, holds the beam and standard firmly joined in a manner that will permit easy detachment when desired.

From the simple nature of this potato-digging attachment for a shovel-plow it may be constructed at a low cost, and furnishes to a party needing an implement of the kind a valuable adjunctive appliance to the cultivator, which is of general use.

Having thus fully described my invention, I claim as new and desire to secure by Letters Patent—

1. A potato-digging attachment for single-shovel plows, consisting in a curved standard C, having attaching bolt *b* at its upper end, a rearward-extending runner *a*, and the shield-shaped shovel or blade B, having tines at its upper end and bolted to the front face of standard C, substantially as set forth.

2. A potato-digger comprising the plow-beam A, having its rear end curved downward, the curved standard C, fitting against the forward edge of said rear end, a bolt b, passing through the two, a link c, embracing the upper end of the standard and the curved end of the beam, a wedge d, driven through the link along the rear edge of said curved end, the runner a, extending rearward from the standard, and the shovel B, bolted to the forward edge of the standard and having a furcated upper edge, substantially as set forth.

AUGUSTUS LEONARD.

Witnesses:
CLAYTON ROWLAND,
JOHN FRIEDEL.